(12) United States Patent
Clemen

(10) Patent No.: US 9,097,259 B2
(45) Date of Patent: Aug. 4, 2015

(54) BLEED AIR OUTLET IN THE BYPASS DUCT OF A TURBOFAN ENGINE

(75) Inventor: Carsten Clemen, Mittenwalde (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 968 days.

(21) Appl. No.: 13/183,143

(22) Filed: Jul. 14, 2011

(65) Prior Publication Data

US 2012/0011827 A1 Jan. 19, 2012

(30) Foreign Application Priority Data

Jul. 19, 2010 (DE) .......................... 10 2010 027 587

(51) Int. Cl.
| | | |
|---|---|---|
| F02K 3/075 | (2006.01) | |
| F04D 27/02 | (2006.01) | |
| F04D 29/68 | (2006.01) | |

(52) U.S. Cl.
CPC ............ *F04D 27/0207* (2013.01); *F02K 3/075* (2013.01); *F04D 29/681* (2013.01)

(58) Field of Classification Search
CPC ..... F02C 6/18; F01D 17/105; F04D 27/0207; F04D 27/0215; F04D 27/0223; F04D 27/02232; F02D 27/023; F02D 27/0238
USPC .................. 60/226.1, 782, 785, 795
See application file for complete search history.

(56) References Cited

U.S. PATENT DOCUMENTS

| | | | |
|---|---|---|---|
| 4,700,544 A | 10/1987 | Fucci | |
| 6,435,816 B1 | 8/2002 | Czachor | |
| 2003/0068223 A1* | 4/2003 | Nikkanen et al. ............. | 415/144 |
| 2004/0213664 A1 | 10/2004 | Wilusz | |
| 2006/0104805 A1 | 5/2006 | Gummer | |
| 2006/0277919 A1 | 12/2006 | Martensson | |
| 2007/0261410 A1* | 11/2007 | Frank et al. .................... | 60/785 |
| 2008/0053105 A1* | 3/2008 | Appleby et al. ............... | 60/785 |
| 2008/0202094 A1 | 8/2008 | Brault | |
| 2009/0126194 A1* | 5/2009 | Appleby et al. ............. | 29/896.6 |
| 2010/0115964 A1* | 5/2010 | Kirby ............................. | 60/785 |

(Continued)

FOREIGN PATENT DOCUMENTS

| | | |
|---|---|---|
| DE | 102004030597 | 1/2006 |
| DE | 60118863 | 5/2007 |

(Continued)

OTHER PUBLICATIONS

German Search Report dated Apr. 6, 2011 from counterpart application.

*Primary Examiner* — Phutthiwat Wongwian
*Assistant Examiner* — Marc J Amar
(74) *Attorney, Agent, or Firm* — Timothy J. Klima; Shuttleworth & Ingersoll, PLC

(57) ABSTRACT

A bleed air outlet provided in the bypass duct of a turbofan engine includes a bleed air tube protruding into the bypass duct and a cover having a plurality of air outlet openings provided in the top of the cover, with the cover being conceived as an elongate, essentially oval, shell-like aerodynamic fairing element (3) which, while extending in the longitudinal direction of the bypass duct, is provided with a longitudinally convexly curved and transversely essentially straight top (10) and sidewalls (11) arcuately extending from the latter to an inner bypass duct wall. Such a design of the bleed air outlet reduces pressure losses, acoustic emissions and vibrations in the bypass duct.

6 Claims, 2 Drawing Sheets

(56) References Cited

U.S. PATENT DOCUMENTS

Figure 1:
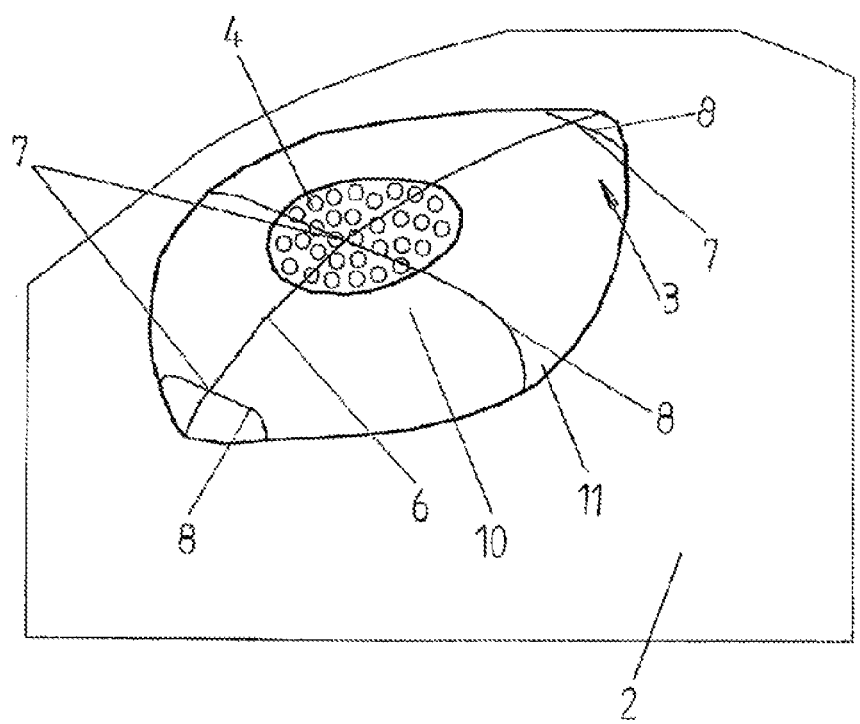

2010/0236256 A1* 9/2010 Hussain et al. ............... 60/785
2011/0146297 A1* 6/2011 Balandier et al. ............. 60/785

FOREIGN PATENT DOCUMENTS

| EP | 1892399 A2 * | 2/2008 | ............... F02C 9/18 |
| WO | WO 03046358 A1 * | 6/2003 | |

* cited by examiner

BLEED AIR OUTLET IN THE BYPASS DUCT OF A TURBOFAN ENGINE

This application claims priority to German Patent Application DE102010027587.5 filed Jul. 19, 2010, the entirety of which is incorporated by reference herein.

This invention relates to a bleed air outlet in the bypass duct of a turbofan engine including a bleed air tube protruding into the bypass duct and defined by a height H and a diameter D and a cover having a plurality of air outlet openings.

On turbofan engines, it is known to convey bleed air from the core flow duct to the bypass duct via a tubing. The bleed air tube, which protrudes into the bypass duct having a diameter D and a height H, has a round cover provided with a plurality of essentially round air outlet openings through which the bleed air enters the bypass duct. The known bleed air outlets are disadvantageous in that, due to the cylindrical cover, high aerodynamic pressure losses occur and, furthermore, uncontrolled flow-off of swirls is to be noted. This leads to increased losses, acoustic emissions and vibrations in the bypass duct and, consequently, higher fuel consumption as well as less stable engine operation.

In a broad aspect, the present invention provides a design of the bleed air outlet in the bypass duct of a turbofan engine such that losses and acoustic emissions and vibrations are reduced.

It is a particular object of the present invention to provide solution to the above problems by an aerodynamic fairing element for the bleed air outlet designed in accordance with the features described herein.

Useful and advantageous developments of the present invention will also be apparent from this description.

The present invention, in essence, provides for an aerodynamically particularly favorably conceived fairing element for the bleed air tube protruding into the bypass duct, so that pressure losses, vibrations and acoustic emissions in the bypass duct are reduced and, consequently, fuel consumption is decreased and engine operation stabilized. The bleed air tube has a cover which is provided with a plurality of air outlet openings and which, according to the present invention, is conceived as elongate, essentially oval, shell-like aerodynamic fairing element which, while extending in the longitudinal direction of the bypass duct, is provided with a longitudinally convexly curved and transversely essentially straight top and sidewalls arcuately extending from the latter to an inner bypass duct wall.

In an advantageous development of the present invention, the shape of the fairing element is defined by a longitudinal curve extending in an x-z plane and a plurality of transverse curves extending in a z-y plane and running symmetrically to the longitudinal axis.

In a further development of the present invention the shape of the longitudinal curve is defined by the equation:

$$\frac{z}{D} = \frac{\frac{H}{XF^2 D}\left[\frac{1}{3}\left(\frac{x}{D} - \frac{x}{D}(X=0)\right)\left(1 - \frac{1}{3}\left(\frac{x}{D} - \frac{x}{D}(X=0)\right)\right)\right]}{\left[1 + \frac{1}{3}\left(\frac{x}{D} - \frac{x}{D}(x=0)\right)\left(\frac{1-2XF}{XF^2}\right)\right]} + \frac{0.05H}{0.3D}$$

with
z/D being the dimensionless z coordinate,
x/D being the dimensionless x coordinate X-3XF,
H being the height of the bleed air tube in the bypass duct,
D being the diameter of the bleed air tube,
XF being a freely selectable parameter between 0.33 and 0.64, and
X being a control variable between 0 and 3, and with any shape being selectable to obtain z =0 at the leading edge and at the trailing edge.

In a further development of the present invention, the shape of the transverse curves supported at a plurality of intersection points xD along the longitudinal curve is defined by the equation:

$$\frac{z}{D} = \frac{z}{D}\left(\frac{x}{D}\right) * \left(1 - \left[\frac{y}{D} - \frac{y}{D}(Y=-1)\right]^8\right)^{\frac{1}{M}}$$

with
z/D being the dimensionless z coordinate,
y/D =Y·(0.05/0.3·H/D +D/H·z/D (x/D) being the dimensionless y coordinate,
x/D being the dimensionless x coordinate X-3XF,
H being the height of the bleed air tube in the bypass duct,
D being the diameter of the bleed air tube,
XF being a freely selectable parameter between 0.33 and 0.64,
Y being a control variable between -1 and 1.

Figure 3:
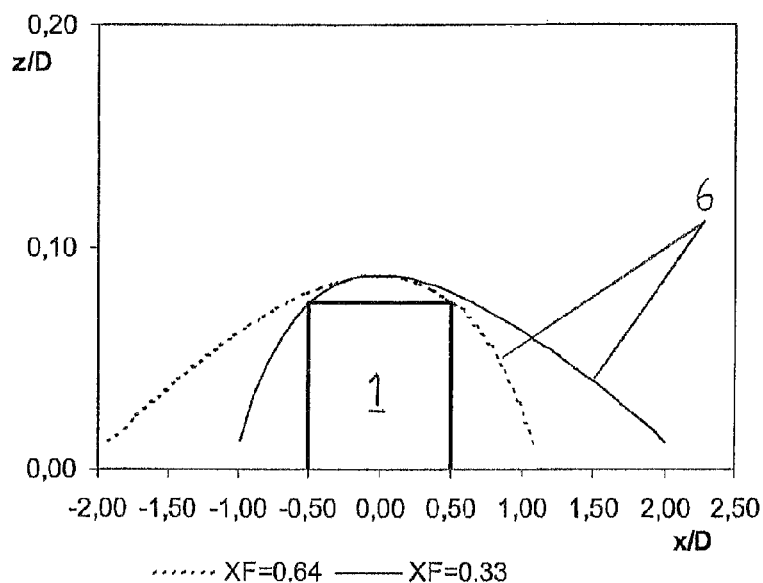
Figure 4:
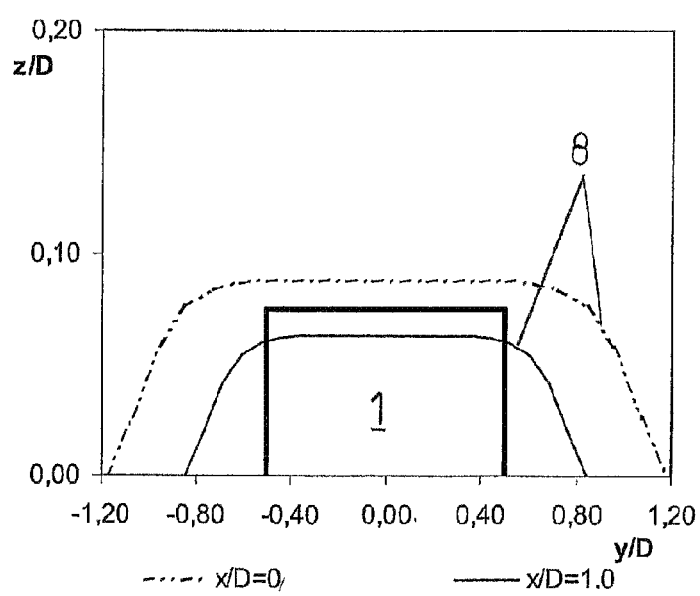

The present invention is more fully described in light of the accompanying drawings showing a preferred embodiment. In the drawings, FIG. 1 is an exemplary perspective view of a fairing element for a bleed air outlet arranged at the inner wall of a bypass duct, FIGS. 2a & 2b are schematic representations of the bleed air tube protruding into the bypass duct and defined by a x-y-z coordinate system, where FIG. 2a shows a side view and FIG. 2b shows an end view, FIG. 3 shows two exemplary curves of the fairing element in the x-z plane, FIG. 4 shows two exemplary curves of the fairing element in the y-z plane.

The fairing element 3 shown in FIG. 1 for a certain height H and a certain diameter D of the bleed air tube 1 in the bypass duct 2 completely covers the bleed air tube 1, only leaving free a plurality of air outlet openings 4—here, for example, in circular arrangement—through which air bled from the core flow duct 5 can be conveyed to the bypass duct 2. The fairing surface of the fairing element 3 is defined by a longitudinal curve 6 extending in the longitudinal direction of the engine, i.e. extending in the direction of the engine axis or, respectively, in z-direction and convexly curved in z-direction, and a plurality of transverse curves 8 adjoining to the longitudinal curve 6 at intersection points 7 and extending in the y-direction and gradually flattening and shortening towards both ends of the longitudinal curve 6 while extending essentially straight in the upper area and descending relatively steeply at the sides. Accordingly, the fairing element 3 is, in top view, a broadly oval shell with, however, a somewhat pointed contour at the small-radius ends which sits with its open side on the inner wall 9 of the bypass duct 2 in the area of the bleed air tube 1 and has a longitudinally convexly curved and transversely essentially straight top 10 and sidewalls 11 extending convexly from the top 10 toward the inner wall 9 of the bypass duct 2. The particular shape of the fairing element 3 minimizes pressure losses and prevents uncontrolled flow off of swirls. The size of the so shaped fairing element 3 is calculated in dependence of the height H by which the bleed-air tube 1 protrudes into the bypass duct and the diameter D of the bleed air tube 1.

Figures 2A, 2B:
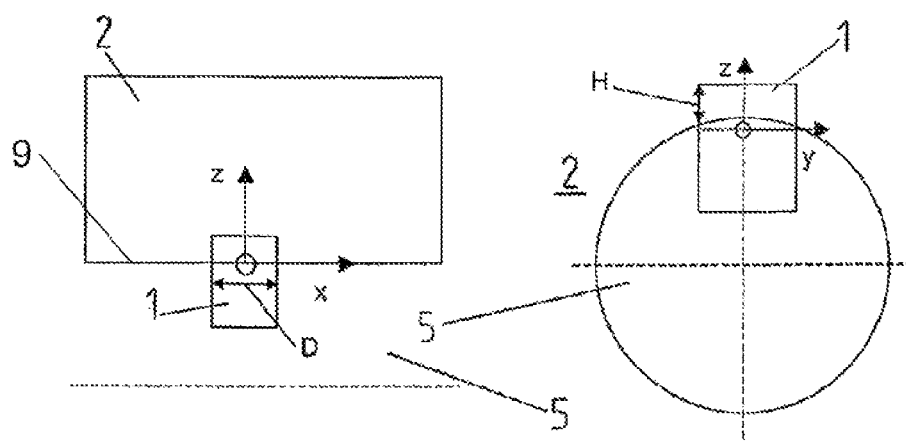

To calculate the longitudinal and transverse curves 6, 8 defining the shape of the fairing element 3 in dependence of the height H and the diameter D of the bleed air tube 1, a fairing geometry is defined in two planes as shown in FIG. 2a: an x-z plane extending in the direction of the engine axis (x-direction =longitudinal direction) and in FIG. 2b: an y-z plane extending normally to the x-z plane, with the origin of both planes being in the center of the bleed air tube 1 at the entry into the bypass duct 2.

The shape of the longitudinal curve 6 in the x-z plane at y =0 is defined with x/D =X−3 XF using the dimensionless coordinate x/D with the auxiliary quantity X and the parameter XF which is freely selectable between 0.33 and 0.64, with X being a control variable from 0 to 3. According to the present invention, FIG. 3 shows shapes in the x-z plane resulting from equation (1):

$$\frac{z}{D} = \frac{\frac{H}{XF^2 D}\left[\frac{1}{3}\left(\frac{x}{D} - \frac{x}{D}(X=0)\right)\left(1 - \frac{1}{3}\left(\frac{x}{D} - \frac{x}{D}(X=0)\right)\right)\right]}{\left[1 + \frac{1}{3}\left(\frac{x}{D} - \frac{x}{D}(x=0)\right)\left(\frac{1-2XF}{XF^2}\right)\right]} + \frac{0.05H}{0.3D}$$

with:
z/D being the dimensionless z coordinate,
x/D being the dimensionless x coordinate X−3XF,
H being the height of the bleed air tube in the bypass duct,
D being the diameter of the bleed air tube,
XF being a freely selectable parameter between 0.33 and 0.64,
X being a control variable between 0 and 3.

The shapes shown in FIG. 3 relate to a diameter D=200 mm and a height H=15 mm, with the dotted line corresponding to an XF of 0.64 and the solid line to an XF of 0.33. In order to obtain z=0 at the leading edge and at the trailing edge of the longitudinal curve 6 of the fairing element 3, any shape is selectable, for example a circular segment with a radius r=0.05/0.3 H/D.

From a plurality of transverse curves 8 extending in the z-y plane, FIG. 4 exemplifies the course of two transverse curves in a coordinate system established by z/D and y/D at the intersection points xD=0 (dashed-and-dotted line) and xD=1 (solid line), namely at M=0.5 and XF=0.33 as well as D=200 mm and H=15 mm. In the y-z plane, the curve shape is defined as z/D at each intersection point x/D=X−3 . XF along an y/D coordinate assigned to each x/D. The respective dimensionless y/D coordinate results as:

$$y/D = Y \cdot (0.05/0.3 \cdot H/D + D/H \cdot z/D(x/D)),$$

with Y being a control variable from +1 to 1 and z/D (xD) being the z/D value calculated as per equation 1 at the respective point x/D. As per equation (2) the respective z/D value in the y-z plane for the definition of the transverse curves 8 results as:

$$\frac{z}{D} = \frac{z}{D}\left(\frac{x}{D}\right) * \left(1 - \left[\frac{y}{D} - \frac{y}{D}(Y=-1)\right]^8\right)^{\frac{1}{M}}$$

with:
M being a freely selectable parameter between 0.5 and 3.5, and
Y being a control variable between −1 and 1.

By use of a plurality of transverse curves 8 calculated as per equation 2 and arranged in the y-z plane at a plurality of intersection points x/D along the longitudinal curve 6 calculated as per equation 1, a fairing surface which, as specified above, is oval and shell-like, is set up whose peripheral contour is adapted to the inner contour of the bypass duct 2 and corresponds to the fairing element 3 with air outlet openings 4 for the portion of a bleed air tube 1 protruding into the bypass duct as shown in FIG. 1.

LIST OF REFERENCE NUMERALS

1 Bleed air tube
2 Bypass duct
3 Fairing element
4 Air outlet openings
5 Core flow duct
6 Longitudinal curve
7 Intersection points
8 Transverse curves
9 Inner wall of 2
10 Top of 3
11 Sidewall of 3

What is claimed is:

1. A bleed air outlet for positioning in a bypass duct of a turbofan engine comprising:
    a bleed air tube protruding into the bypass duct and defined by a height H and a diameter D, and
    a cover including a top, first and second sidewalls and at least one air outlet opening provided in the top for communicating with the bleed air tube, the cover acting as an aerodynamic fairing element and having an elongate plan shape generally of a vesica piscis extending in a longitudinal direction of the bypass duct, the top having a longitudinally convexly curved and transversely essentially straight shape, the first and second sidewalls arcuately extending from opposite sides of the top to an inner bypass duct wall;
    wherein side walls of the generally vesica piscis plan shape extending from a forward tip of the cover to a rearward tip of the cover are curved throughout and absent linear portions.

2. The bleed air outlet of claim 1, wherein the shape of the fairing element is defined by a longitudinal curve extending in an x-z plane and a plurality of transverse curves extending in a z-y plane and running symmetrically to the longitudinal axis.

3. The bleed air outlet of claim 2, wherein a shape of the longitudinal curve is defined by an equation:

$$\frac{z}{D} = \frac{\frac{H}{XF^2 D}\left[\frac{1}{3}\left(\frac{x}{D} - \frac{x}{D}(X=0)\right)\left(1 - \frac{1}{3}\left(\frac{x}{D} - \frac{x}{D}(X=0)\right)\right)\right]}{\left[1 + \frac{1}{3}\left(\frac{x}{D} - \frac{x}{D}(x=0)\right)\left(\frac{1-2XF}{XF^2}\right)\right]} + \frac{0.05H}{0.3D}$$

with:
z/D being a dimensionless z coordinate,
x/D being a dimensionless x coordinate X−3XF,
H being the height of the bleed air tube in the bypass duct,
D being the diameter of the bleed air tube,
XF being a freely selectable parameter between 0.33 and 0.64, and
X being a control variable between 0 and 3, and with any shape being selectable to obtain z=0 at the leading edge and at the trailing edge.

4. The bleed air outlet of claim 3, wherein a shape of the transverse curves at a plurality of intersections along the longitudinal curve is defined by an equation:

$$\frac{z}{D} = \frac{z}{D}\left(\frac{x}{D}\right) * \left(1 - \left[\frac{y}{D} - \frac{y}{D}(Y=-1)\right]^8\right)^{\frac{1}{M}}$$

with:

z/D being the dimensionless z coordinate, y/D =Y ·(0.05/0.3·H/D +D/H ·z/D (x/D)) being a dimensionless y coordinate, x/D being the dimensionless x coordinate X-3XF, H being the height of the bleed air tube in the bypass duct, D being the diameter of the bleed air tube, XF being the freely selectable parameter between 0.33 and 0.64, M being a freely selectable parameter between 0.5 and 3.5, and Y being a control variable between −1 and 1.

5. The bleed air outlet of claim 4, wherein the cover has a plurality of air outlet openings provided in the top.

6. The bleed air outlet of claim 2, wherein a shape of the transverse curves at a plurality of intersections along the longitudinal curve is defined by an equation:

$$\frac{z}{D} = \frac{z}{D}\left(\frac{x}{D}\right) * \left(1 - \left[\frac{y}{D} - \frac{y}{D}(Y=-1)\right]^8\right)^{\frac{1}{M}}$$

with:

z/D being a dimensionless z coordinate, y/D =Y ·(0.05/0.3·H/D +D/H ·z/D (x/D)) being a dimensionless y coordinate, x/D being a dimensionless x coordinate X-3XF, H being the height of the bleed air tube in the bypass duct, D being the diameter of the bleed air tube, XF being a freely selectable parameter between 0.33 and 0.64, M being a freely selectable parameter between 0.5 and 3.5, and Y being a control variable between −1 and 1.

\* \* \* \* \*